(No Model.)  2 Sheets—Sheet 1.
J. W. WARNER.
ADJUSTABLE COUPLING FOR BOILER DRUMS.
No. 532,614. Patented Jan. 15, 1895.
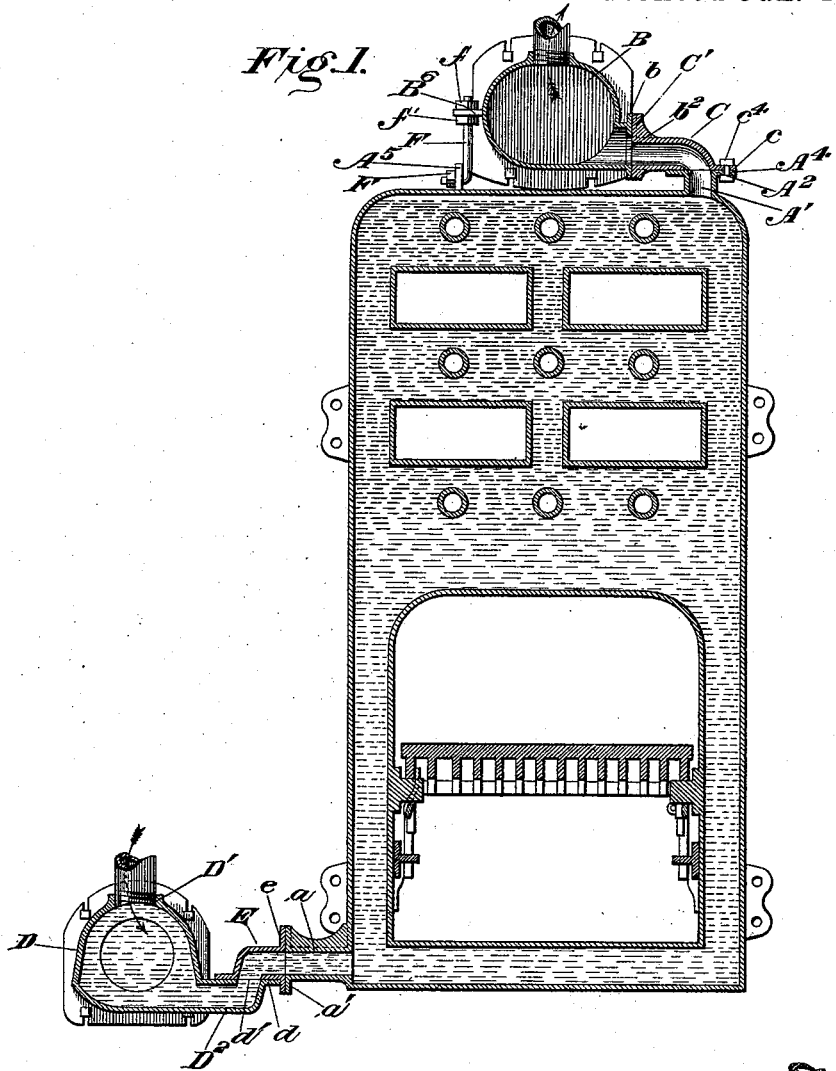
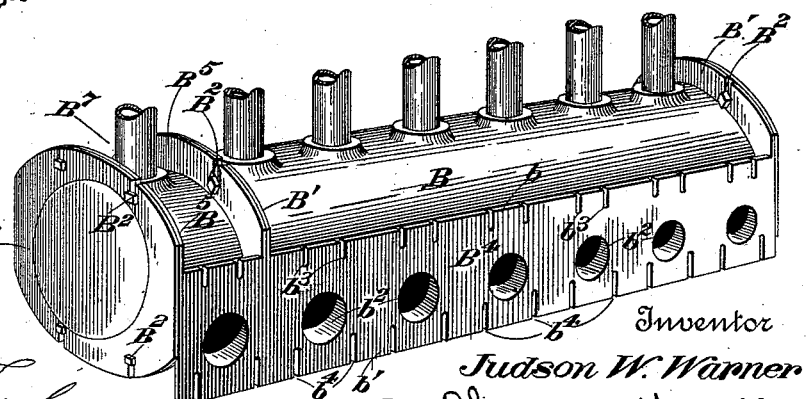
Witnesses
M. E. Fowler
James R. Mansfield
Inventor
Judson W. Warner
by Alexander Howell
Attorneys (No Model.) 2 Sheets—Sheet 2.

J. W. WARNER.
ADJUSTABLE COUPLING FOR BOILER DRUMS.

No. 532,614. Patented Jan. 15, 1895.

Witnesses
M. E. Fowler
James R. Mansfield

Inventor
Judson W. Warner
by Alexander & Dowell
Attorneys

UNITED STATES PATENT OFFICE.

JUDSON W. WARNER, OF ONEIDA, NEW YORK.

ADJUSTABLE COUPLING FOR BOILER-DRUMS.

SPECIFICATION forming part of Letters Patent No. 532,614, dated January 15, 1895.

Application filed January 29, 1894. Serial No. 498,387. (No model.)

*To all whom it may concern:*

Be it known that I, JUDSON W. WARNER, of Oneida, in the county of Madison and State of New York, have invented certain new and useful Improvements in Adjustable Rapid Couplings for Boiler-Drums; and I do hereby declare that the following is a full, clear, and exact description thereof, reference being had to the accompanying drawings, and to the letters of reference marked thereon, which form part of this specification.

This invention relates to means for connecting drums to boilers, and especially to connections between drums and sectional boilers used for steam or hot-water heating.

My invention provides adjustable couplings which can be moved sidewise or up and down, so as to make perfectly tight joints between the boiler and drums, and which can be easily and rapidly connected by an ordinary workman not even skilled in the mechanical art of steam-fitting.

Heretofore great difficulty has been frequently experienced by the most expert steam-fitters in connecting drums to sectional boilers, as the ordinary connection is made by a pipe joint threaded at both ends, which respectively screw into threaded openings in the drum and boiler section, and the utmost care and skill is necessary to make the joints at both ends tight, involving large expense and great trouble. In the present mode, all the threaded pipe joints have to be first screwed into the drum, before it is placed in position, and then screwed into the boiler side, and made fast in such position. Then the connections with the radiators are made; but should an imperfect pipe or thread cause a leaky joint, it is necessary to remove or loosen all the other pipes in order to replace the damaged joint. By my adjustable rapid couplings any one joint can be removed and repacked without disturbing others in any manner. They are inexpensive, and perfectly reliable.

Figure 3:
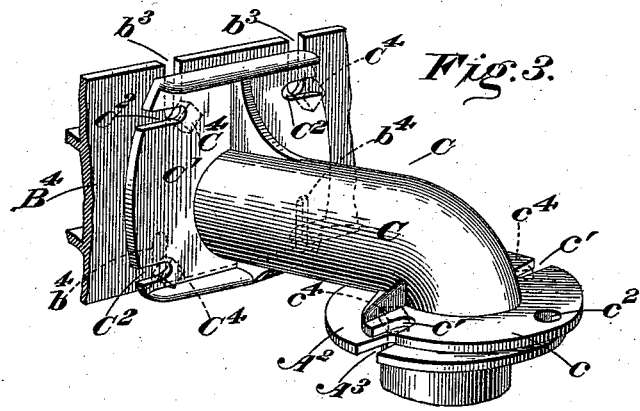
Figure 4:
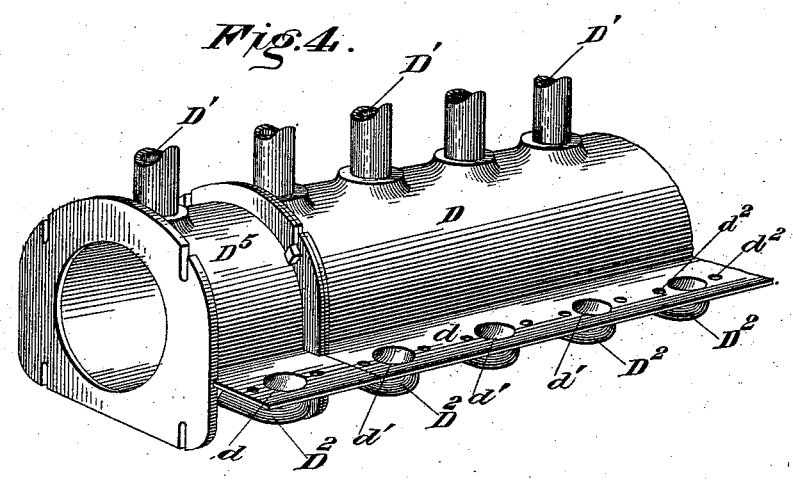
Figure 5:
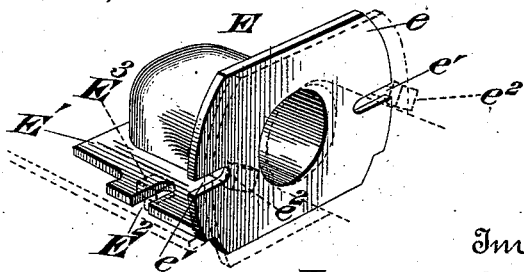

The invention comprises a novel construction of the drums, and of the couplings which are used to connect the drum with the water spaces of the boiler sections, and it consists in the combination of, and construction of, parts set forth in the claims, and described in detail as follows:

Referring to the drawings, Figure 1 represents a detail transverse sectional view through a sectional boiler and the top and bottom drums, and the adjustable connections therebetween. Fig. 2 is a detail perspective view of the top drum, showing one of the top drum sections employed to lengthen the drum; Fig. 3, a perspective view of one of the top drum and boiler couplings. Fig. 4 is a detail perspective view of the bottom drum detached, showing one of the bottom drum sections employed to lengthen the drum. Fig. 5 is a detached view of one of the couplings between bottom drum and boiler.

Referring to the drawings by letter:—A designates a section of a boiler furnace; B, the top drum; C, one of the adjustable couplings between the top drum and boiler; D, the bottom drum, and E one of the adjustable couplings between such drum and boiler.

Drum B is preferably made of cast metal, is tubular, and as long as the ordinary sectional boiler to which it is connected, say six sections. It is closed at one end, and at its other end has a flange B' which is slotted or perforated for the passage of bolts $B^2$ which secure a head $B^3$ thereto. It also has a series of openings in its top, in which the ends of the radiator pipes are secured. At one side of this drum is a flat surface $B^4$ which has top and bottom flanges $b$, $b'$, which are dressed smooth. By making these flanges continuous as shown the side of the drum and flanges can be dressed in an ordinary planing machine. In this side are a series of openings $b^2$ one for each section to which the drum is to be connected, and in the upper flange $b$, above each opening, are formed two open vertical slots or elongated holes $b^3$, and below each opening two similar slots $b^4$ are made in flange $b'$. Thus there are several slots around each opening, arranged almost equi-distant.

The couplings C are tubular, and so as to connect with the openings in the drum, and in the tops of the sections, which openings are at right angles to each other. The end of each coupling which connects with the drum is flanged, as at C' and dressed perfectly smooth so as to fit closely against the side $b^4$ of the drum over one of the openings $b^2$ therein. In this flange are formed slots or elongated holes $C^2$, at points coincident with the slots $b^3$, $b^4$, around the openings, but slots or holes $C^2$ extend horizontally, instead of vertically, and thus stand at about right angles to slots $b^3$, $b^4$. The couplings are secured to the drum by bolts $C^4$ passing through the coincident slots in flanges $b$, $b'$, and $C'$, as shown in the drawings. The other end of the coupling is flanged at $c$, said flange having two open slots or elongated holes $c'$, one at each side, and a front perforation $c^2$, which may be an open slot if desired. This flange is dressed smooth on its face to fit closely on a similarly dressed flange $A^2$ around the mouth of the top opening $A'$ of the boiler section, and flange $A^2$ is slotted or perforated at $A^3$, $A^4$, to correspond with the slots and perforations in flange $c$, and the joint is secured to the section by means of bolts $c^4$ passing through the corresponding slots and perforations in flanges $c$, $A^2$, as shown.

Each coupling C is connected to the drum and a boiler section in this manner, and obviously each is detachable and adjustable independently of its fellow, and owing to the open slots or elongated holes, the drum end of the coupling can be adjusted laterally or vertically and a close joint made, even though the bore of pipe and opening $b^2$ do not exactly register; and the other end of the coupling can be adjusted laterally on flange $A^2$ as accurate register of the bore of the joint and opening $A'$ of the section is not essential. Therefore if the openings in the boiler and drum are not in line, one being in advance, behind, above, below or to one side of its proper position in relation to the other, as may frequently occur by reason of defective, or irregular, setting of the sections, yet my adjustable connections compensate for all such irregularities and not requiring any special adjustment can be put in place by unskilled workmen and tight joints made. In practice a suitable packing may be interposed between the meeting faces of the flanges.

Drum B may be connected at each side to the sections, in which case both sides of the drum would be constructed as above described, but one connection with each section is usually sufficient.

In order to uphold and level the "off" side of the drum, while making the connections, I employ short rods F, at each end of the drum, the lower ends of which are bent at right angles, and secured to ears $A^5$ on top of the front and rear sections, by a nut $F'$. The upper ends of the rods are screw threaded, and pass through lateral eyes $B^6$ on the drum, and nuts $f, f'$, are screwed on the rods respectively above and below said eyes, and by adjusting said nuts the drum can be leveled and locked rigidly in position.

The bottom drum D has a series of openings $D'$ in its top side with which the return pipes from the radiators are connected, and on the side adjoining the sections it has a horizontally extending flange $d$, through which are a series of openings $d'$ communicating with the interior of the drum by curved pipe elbows $D^2$ below the flange, cast integral with the drum. At each side of each opening $d'$ is an elongated perforation $d^2$ for the passage of a bolt. The entire top surface of this flange $d$ can be dressed smooth in an ordinary planer.

E designates one of the couplings, used to connect the bottom drum to the boiler sections. This coupling has a flange $E'$ on its bottom having open slots $E^2$ on its opposite sides, adapted to coincide with the perforations $d^2$ beside an opening $d'$, the coupling being secured thereto by bolts $E^3$ passing through said perforations and slots as shown. The other end of the coupling is also flanged at $e$, flange $e'$ standing perpendicular to flange $E'$, and having open slots or elongated holes $e'$ on each side, adapted to register with perforations in a flange $a'$ surrounding an opening $a$ in the side of the section as shown, and bolts $e^2$ passing through said perforations and slots secure the coupling to the section. The coupling E thus constructed forms an adjustable connection which will not require accurate adjustment of the bottom drum and sections in relation to each other, and can be made by ordinary workmen with ease and rapidity.

Suitable packing may be used between coupling E and the drum and sections.

The advantages of my improved adjustable connections over threaded joints is obvious, and I believe myself the first to use an angle flush joint adjustable as described, in connecting drums to boilers, and obviously the invention does not reside solely in the peculiar shape and slotting of the joints, which would necessarily be varied according to the locations of the drums in relation to the boiler sections. I would also consider it within the scope of my invention if one end of the coupling was fastened rigidly in any ordinary manner, provided the other end thereof was rendered adjustable and connected in accordance with my invention.

The drums are cast in one piece of a length sufficient to connect with a certain number of boiler sections, constituting a furnace; but as a principal object of sectional boilers is to enable the capacity of the boiler to be increased at any time by simply adding additional boiler sections, I provide for lengthening the drums, by forming sections thereof, as indicated in Figs. 2 and 4. The section $B^4$ of the top drum, has flanges $B^5$ at both ends corresponding to the flange $B'$ of the drum, so that it can be bolted thereto, in place of head $B^3$, which latter is then bolted to the outer end of the section, and the section has top and side openings and slotted flanges similar to those of the drum, as indicated by similar reference letters in the drawings, so that a coupling C can be connected thereto. The section $D^5$ can be similarly secured to drum D and has openings, flanges, elbows, and perforations, similar to those of drum D, as indicated in the drawings. Thus I can readily increase the capacity of the furnace by adding additional sections, drums, and connections, without necessarily disturbing any of said parts, except the front section of the furnace and its drum connections.

Having thus described my invention, what I claim as new, and desire to secure by Letters Patent thereon, is—

1. The combination of a boiler, and a drum: with a flush joint coupling connecting said parts, said coupling being adjustable independently of either the boiler or drum and having flanged ends dressed smooth on the outer faces so as to make close joints with similarly dressed surfaces around the openings in the drum and boiler and means for securing the couplings in position, substantially as described.

2. In combination the drum B having longitudinal side flanges $b$, $b'$ and end flanges $B'$, substantially as described; with the drum section $B^5$, having flanges on both ends similar to flange $B'$, and side flanges corresponding to and forming a continuation of flanges $b$, $b'$, and means for securing the drum section to the drum, substantially as described.

3. The combination of the section having flanged opening, a drum also having a flanged opening, said flanges being slotted or having elongated holes, with a coupling having both ends flanged to fit flush against the flanged openings in drum and section respectively, and its flanges slotted or with elongated holes to substantially coincide with the slots or holes of the flanges on section and drum, and bolts placed in the coincident holes for uniting the coupling to the drum and section, while allowing independent adjustment of the coupling, so as to make tight flush joints with both section and drum substantially as and for the purpose specified.

4. The combination with the drum D having a longitudinal horizontal flange $d$, and pipe elbows $D^2$ below said flange, substantially as described; of the drum section $D^5$ having lateral horizontal flange similar to and forming a continuation of flange $d$, and an elbow similar to $D^2$, and means for securing the drum section to the end of drum, substantially as specified.

5. The herein described right angled pipe coupling C having flanges $c$ $C'$ on its ends dressed smooth and slotted or made with elongated holes $c'$ $C^2$, the slots on the same side of coupling being parallel so that the coupling may be adjusted laterally without moving the fastening bolts thereof substantially as and for the purpose set forth.

6. The herein described adjustable pipe connection for boilers and drums, bent at right angles and having flanges on its ends arranged at right angles to each other dressed smooth on their outer faces and slotted the slots on the same side of coupling being parallel so that the coupling may be adjusted laterally without moving the fastening bolts thereof substantially as and for the purpose set forth.

7. The combination of the boiler, the drum, the angular flush joint adjustable connections between boiler and drum, supporting the drum at one side and the angular leveling rod adjustably connecting the drum to and supporting it on the boiler, at the sides opposite the joints, substantially as set forth.

8. The herein described pipe coupling C bent at right angles having one long and one short arm; each arm being flanged around its mouth as at $c$, $C'$, respectively; the flange $c$ having one pair of diametrically opposite slots $c'$; and flange $C'$ having two pair of outwardly opening opposite slots $C^2$, one pair of said slots being entirely above the exterior surface of the pipe, substantially as described.

9. The herein described elbow pipe coupling E, having flared flanges on its ends, said flanges being perpendicular to each other, and each having a single pair of outwardly opening diametrically opposite slots, the slots on the same side of joint being parallel with each other, substantially as described.

In testimony that I claim the foregoing as my own I affix my signature in presence of two witnesses.

JUDSON W. WARNER.

Witnesses:
JAMES D. COOK,
D. A. SCHUYLER.